US010194066B2

United States Patent
Jung et al.

(10) Patent No.: US 10,194,066 B2
(45) Date of Patent: Jan. 29, 2019

(54) CAMERA APPARATUS AND ELECTRONIC DEVICE INCLUDING THE SAME

(71) Applicant: Samsung Electronics Co., Ltd., Suwon-si, Gyeonggi-do (KR)

(72) Inventors: Hwa-Joong Jung, Osan-si (KR); Sung-Goo Her, Suwon-si (KR); Hyung-Jin Rho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/042,523

(22) Filed: Feb. 12, 2016

(65) Prior Publication Data

US 2016/0241763 A1    Aug. 18, 2016

(30) Foreign Application Priority Data

Feb. 13, 2015    (KR) .......................... 10-2015-0022473

(51) Int. Cl.
*H04N 5/225*    (2006.01)

(52) U.S. Cl.
CPC ......... *H04N 5/2257* (2013.01); *H04N 5/2252* (2013.01); *H04N 5/2253* (2013.01); *H04N 5/2254* (2013.01)

(58) Field of Classification Search
CPC .. H04N 5/2257; H04N 5/2252; H04N 5/2253; H04N 5/22254
See application file for complete search history.

(56) References Cited

U.S. PATENT DOCUMENTS

| 8,605,211 | B2 | 12/2013 | Webster et al. |
| 2007/0212061 | A1 | 9/2007 | Woo |
| 2007/0264002 | A1* | 11/2007 | Lee ........................ G03B 17/02 396/275 |
| 2008/0252775 | A1* | 10/2008 | Ryu ..................... H04N 5/2253 348/374 |
| 2009/0051774 | A1 | 2/2009 | Shiraishi |
| 2009/0103194 | A1 | 4/2009 | Chen |
| 2012/0276951 | A1 | 11/2012 | Webster et al. |
| 2014/0205275 | A1 | 7/2014 | Kuo |
| 2015/0350500 | A1* | 12/2015 | Gutierrez ............. H04N 5/2253 348/374 |

FOREIGN PATENT DOCUMENTS

| EP | 1 895 359 A1 | 3/2008 |
| JP | 2004297282 A | 10/2004 |
| KR | 10-2012-0118894 A | 10/2012 |

* cited by examiner

*Primary Examiner* — James Hannett
(74) *Attorney, Agent, or Firm* — Jefferson IP Law, LLP

(57) ABSTRACT

An electronic device is provided that includes a first cover defining one surface, a second cover defining an opposite surface, and a camera assembly of which at least a portion is arranged in a space between the first cover and the second cover. The camera assembly includes a metal plate arranged substantially parallel to the first cover, a printed circuit board arranged between the first cover and the metal plate, the printed circuit board having an opening arranged substantially at a center, and at least one through-hole arranged outside the opening, an image sensor arranged in the opening and attached to the metal plate, a lens assembly arranged adjacent to the image sensor, and a side surface that surrounds at least a portion of the image sensor and the lens assembly. At least a portion of the side surface passes through the through-hole to be connected to the metal plate.

20 Claims, 16 Drawing Sheets

CAMERA APPARATUS AND ELECTRONIC DEVICE INCLUDING THE SAME

CROSS-REFERENCE TO RELATED APPLICATION(S)

This application claims the benefit under 35 U.S.C. § 119(a) of a Korean patent application filed on Feb. 13, 2015 in the Korean Intellectual Property Office and assigned Serial number 10-2015-0022473, the entire disclosure of which is hereby incorporated by reference.

TECHNICAL FIELD

The present disclosure relates to a camera apparatus and an electronic device including the same. More particularly, the present disclosure relates to a camera apparatus that may implement slimness and mitigate the distortion thereof during the manufacturing process and an electronic device including the same.

BACKGROUND

In general, a portable electronic device refers to a device that allows the user to access various contents while carrying it, and includes a portable terminal, a Moving Picture Experts Group phase 1 or phase 2 (MPEG-1 or MPEG-2) audio layer 3 (MP3) player, and a personal media player (PMP). The portable electronic device has become multi-functional according to the need of consumers and has gradually become small in size.

In particular, the portable terminals are becoming multi-functional according to various needs of the consumers due to its portability. Further, due to the recent development of technologies, the portable terminals have been used for the multi-convergence of music, movies, televisions (TVs), and games, as well as simple phone functions. A representative apparatus that leads the portable electronic device to multi-convergence is a camera apparatus.

The pixels of the camera apparatus have increased from 300,000 pixels (i.e., video graphic array (VGA) level) to the current high number of pixels, and the camera apparatus has been equipped with various additional functions, such as autofocusing or optical zoom.

Generally, a compact camera module (CCM) is small-sized and is applied to mobile communication devices, such as a camera phone, a personal digital assistant (PDA), and a smartphone, and various information technology (IT) devices, such as a toy camera, and devices on which small-sized camera modules are mounted have recently increased according to various tastes of the consumers.

The camera apparatus employs a semiconductor chip (hereinafter, referred to as an image sensor), such as a charge coupled device (CCD) or a complementary metal-oxide semiconductor (CMOS) image sensor (CIS), as a main component, and an image of an object condensed by the image sensor is stored in a memory in the device as data, and the stored data are displayed as an image through a display medium, such as a display panel of the device.

The image sensor is mounted on a board (hereinafter, referred to as a printed circuit board), such as a printed circuit board (PCB) or a ceramic substrate, and a lens cylindrical body including a lens is coupled onto the printed circuit board including the image sensor to assemble the image sensor.

A general structure and assembly process of a camera apparatus is as follows.

The camera apparatus includes a lower module, such as an image sensor module, and an upper module, such as a lens assembly module, which are coupled to each other after being manufactured separately.

First, a process of the lower module of the camera apparatus will be described. The lower module of the camera apparatus may include an image sensor and a printed circuit board. The assembly manner of the image sensor module may include a wire bonding manner and a flip chip bonding manner.

The image sensor module through the wire bonding manner may be configured such that an image sensor is mounted on an upper surface of a printed circuit board through a coupling method, such as die bonding. The image sensor that is mounted on the printed circuit board may form a lower module of the camera apparatus by bonding (hereinafter, referred to as wire bonding) the image sensor to the printed circuit board using an electrical signal line, such as a wire, such that it is electrically connected to the printed circuit board.

The image sensor module, when employing a flip chip technique, may be electrically connected to the bottom surface of the printed circuit board through an electrical connection of a bump and a pad by using a flip chip on which the image sensor is mounted.

Furthermore, a process of the upper module of the camera apparatus will be described. The upper module of the camera apparatus may include a lens assembly, a cover glass or IR filter, and a lens housing including them. A lens assembly including at least one lens module and a correction member that drives the lens module and corrects an image through at least one of automatic driving and manual driving of the lens is mounted on the housing to form the upper module. In particular, the upper module of the camera apparatus may be coupled to the lower module through thermoplastic bonding.

The IR filter may be mounted on the lower side of the housing or the upper side of the image sensor module through an adhesive, such as epoxy.

After the image sensor module is assembled, the optical axis of the image sensor is aligned, and after the upper module is assembled on the lower module, the optical axes of the lens assembly and the image sensor are aligned.

In order to focus the image sensor and the lens, the optical axes of the image sensor and the lens should be located on the same line.

However, the lower module may be mounted while the image sensor is distorted from a surface of the printed circuit board due to distortion of the printed circuit board or an unbalanced surface of the printed circuit board when the image sensor and the printed circuit board is assembled. Accordingly, because the image sensor and the lens module are not located on the same line, the optical axis is distorted.

When the image sensor is distorted, the distortion of the introduced optical axis cannot be corrected, and accordingly, the productivity and quality of the camera apparatus may deteriorate.

Distortion of the optical axis may occur even in the process of assembling the upper module on the lower module. That is, the housing including the lens assembly is seated on and fixed to an upper surface of the printed circuit board on which the image sensor is mounted through thermoplastic bonding, and as described above, the housing seated on and fixed to the surface of the printed circuit board may be mounted while being distorted due to the distortion of the printed circuit board or an unbalanced surface of the printed circuit board.

A defect such as tilting may occur due to a tolerance of a component or lack of precision in the process of assembling the above-mentioned camera apparatus, which directly causes a resolution defect. In detail, a defect may occur in the process of mounting the image sensor on the printed circuit board or in the process of mounting and fixing the housing including the lens assembly to an upper side of the image sensor module, which directly causes the resolution defect.

In particular, because the high-resolution camera apparatus requires a high level as compared with a low-resolution camera apparatus in relation to the alignment of the optical axes of the lens and the sensor, the precision of the device increases and the development and production costs also increase for the high-resolution camera apparatus.

Accordingly, a tilting correction method for a camera apparatus that minimizes tilting of the sensor and the lens and decrease defect rate when the high-resolution camera apparatus is assembled, and facilitates the development of the camera apparatus and reduces production costs, and an apparatus that support the method are required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a camera apparatus that restricts tilting of components occurring when a lower module of the camera apparatus is assembled, and mitigates tilting of components when the lower module and an upper module of the camera apparatus are assembled, and an electronic device including the same.

In accordance with an aspect of the present disclosure, an electronic device is provided. The electronic device includes a first cover that defines one surface of the electronic device, a second cover that defines an opposite surface of the electronic device, and a camera assembly of which at least a portion is arranged in a space defined between the first cover and the second cover, wherein the camera assembly includes a metal plate that is arranged substantially parallel to the first cover, a printed circuit board that is arranged between the first cover and the metal plate, the printed circuit board having an opening arranged substantially at a center thereof, and at least one through-hole arranged outside the opening, an image sensor that is arranged in the opening and is attached to the metal plate, a lens assembly that is arranged adjacent to the image sensor, and a side surface that surrounds at least a portion of the image sensor and the lens assembly, and wherein at least a portion of the side surface passes through the through-hole to be connected to the metal plate.

In accordance with another aspect of the present disclosure, an electronic device is provided. The electronic device includes a first cover that defines one surface of the electronic device, a second cover that defines an opposite surface of the electronic device, and a camera assembly of which at least a portion is arranged in a space defined between the first cover and the second cover, wherein the camera assembly includes a printed circuit board, a metal plate that is mounted on the printed circuit board and arranged substantially parallel to the first cover, the metal plate having a protruding surface, an image sensor that is attached to the metal plate, a lens assembly that is arranged adjacent to the image sensor, and a side surface that surrounds at least a portion of the image sensor and the lens assembly, and wherein at least a portion of the side surface has a depressed portion that is seated on the protruding surface and is connected to the metal plate while corresponding to the protruding surface.

In accordance with another aspect of the present disclosure, a camera apparatus is provided. The camera apparatus includes a board that has a metal plate that is flat, and a printed circuit board provided on the metal plate and having a first opening and a second opening around the first opening, an image sensor that is seated on the metal plate through an inner side of the first opening and is electrically connected to the printed circuit board, and a housing on which a lens assembly arranged adjacent to the image sensor is mounted, and which surrounds the image sensor, wherein the housing passes through the second opening and is seated on the metal plate.

In accordance with another aspect of the present disclosure, a camera apparatus is provided. The camera apparatus includes a board that includes a printed circuit board, and a metal plate mounted on the printed circuit board and having a protruding surface at at least a portion of the outside thereof, an image sensor that is mounted on the metal plate and is electrically connected to the printed circuit board, and a housing on which a lens assembly is arranged adjacent to the image sensor and which has a depressed portion in which the lens assembly is seated to correspond to the protruding surface, the housing being configured to surround the image sensor.

In accordance with another aspect of the present disclosure, the camera apparatus and the electronic device including the same can mitigate deflection or deformation of the printed circuit board by mounting and supporting the printed circuit board on the metal plate, and can implement a thin overall thickness of the camera apparatus by mounting the image sensor on one surface of the metal plate through the inner side of the opening provided in the printed circuit board.

In accordance with another aspect of the present disclosure, the camera apparatus and the electronic device including the same can mount the image sensor on the board with a flatness by mounting the image sensor on the metal plate, and therefore can restrict distortion of the image sensor when the image sensor is assembled and assemble the image sensor while the optical axis of the image sensor coincides with the optical axis.

Further, in accordance with another aspect of the present disclosure, the camera apparatus and the electronic device including the same can increase the reliability of the flatness of the image sensor when the image sensor module is assembled.

Furthermore, in accordance with another aspect of the present disclosure, the camera apparatus and the electronic device including the same can assemble the housing seated on and fixed to the upper side of the image sensor module while the axis of the housing coincides with the optical axis of the lower module due to the flatness of the image sensor.

Furthermore, in accordance with another aspect of the present disclosure, the camera apparatus and the electronic device including the same can improve productivity and increase the efficiency of the work process by assembling the housing while the optical axes of the housing and the image sensor coincide with each other when the housing is fixed to the upper side of the image sensor module, and can increase reliability due to tilting in the process of the camera apparatus.

Furthermore, in accordance with another aspect of the present disclosure, the camera apparatus can mitigate distortion or deformation of the second body when an impact is applied to the camera apparatus because the metallic second body is covered to the lower side of the first body and makes contact with the metal plate to be fixed.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
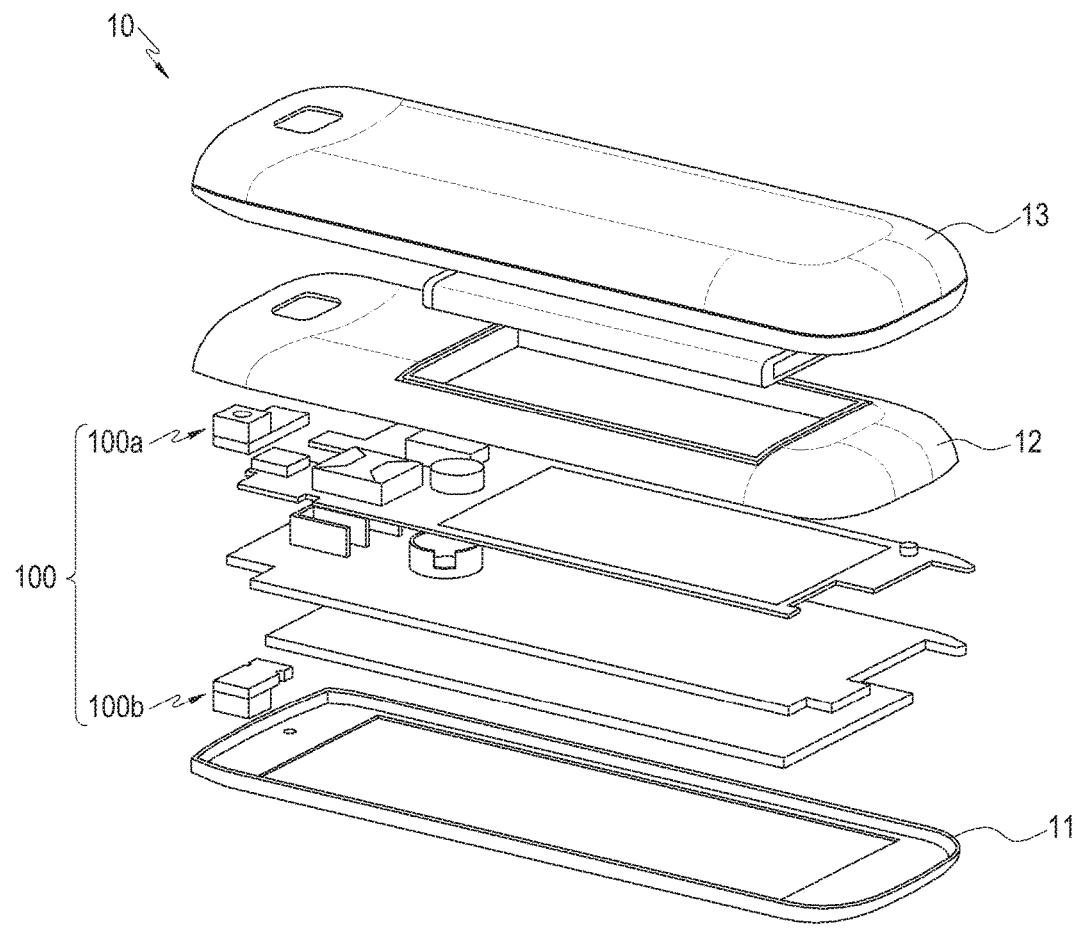
FIG. 1 is an exploded perspective view illustrating an electronic device including a camera apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal terms such as "first" and "second" may be used to describe various elements, these elements are not limited by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

Further, the relative terms "a front surface", "a rear surface", "a top surface", "a bottom surface", and the like which are described with respect to the orientation in the drawings may be replaced by ordinal numbers such as first and second. In the ordinal numbers such as first and second, their order are determined in the mentioned order or arbitrarily and may not be arbitrarily changed if necessary.

In the present disclosure, the terms are used to describe specific embodiments, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

In the present disclosure, an electronic device may be a random device, and the electronic device may be called a terminal, a portable terminal, a mobile terminal, a communication terminal, a portable communication terminal, a portable mobile terminal, a display device or the like.

For example, the electronic device may be a smartphone, a portable phone, a game player, a television (TV), a display unit, a heads-up display unit for a vehicle, a notebook computer, a laptop computer, a tablet personal computer (PC), a personal media player (PMP), a personal digital assistants (PDA), and the like. The electronic device may be implemented as a portable communication terminal which has a wireless communication function and a pocket size. Further, the electronic device may be a flexible device or a flexible display device.

Further, the electronic device may be a wearable device that can be worn on the body, and the wearable device may be provided to be linked with an electronic device such as a smart phone.

The electronic device may communicate with an external electronic device, such as a server or the like, or perform an operation through an interworking with the external electronic device. For example, the electronic device may transmit an image photographed by a camera and/or position information detected by a sensor unit to the server through a network. The network may be a mobile or cellular communication network, a local area network (LAN), a wireless local area network (WLAN), a wide area network (WAN), an Internet, a small area network (SAN) or the like, but is not limited thereto.

FIG. 1 is an exploded perspective view illustrating an electronic device 10 including a camera apparatus 100 according to an embodiment of the present disclosure.

Figure 2:
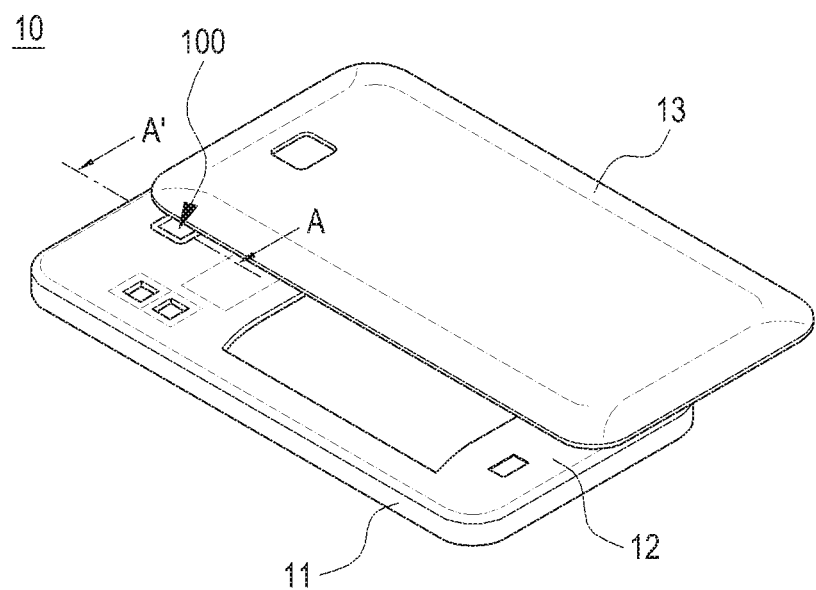
FIG. 2 is a perspective view illustrating a rear surface of the electronic device including a camera apparatus according to an embodiment of the present disclosure.

FIG. 2 is a perspective view illustrating a rear surface of an electronic device 10 including a camera apparatus 100 according to an embodiment of the present disclosure.

Figure 3:
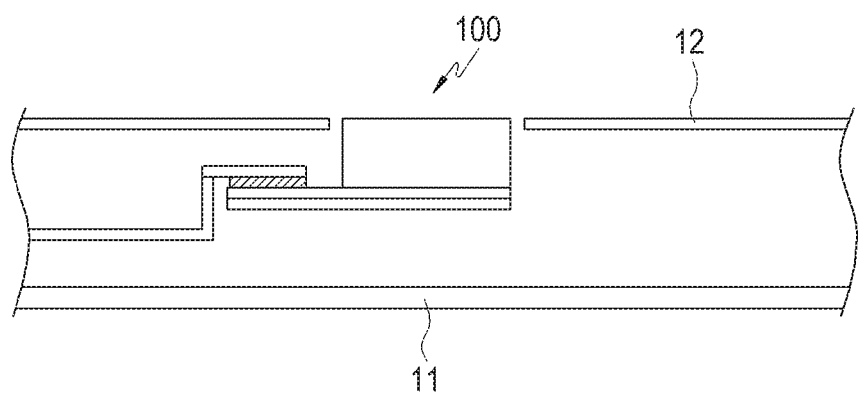
FIG. 3 is a sectional view taken along a line A-A' of FIG. 2 according to an embodiment of the present disclosure.

FIG. 3 is a sectional view taken along a line A-A' in FIG. 2 according to an embodiment of the present disclosure.

Referring to FIGS. 1 to 3, the electronic device 10, according to the embodiment of the present disclosure, may include a first cover 11 that forms one surface of the electronic device 10, a second cover 12 that forms an opposite surface of the electronic device 10 and is coupled to the first cover 11, and a camera assembly (hereinafter, referred to as a camera apparatus 100), and may further include a battery cover 13 that covers the second cover 12.

It will be exemplified that the first cover 11, according to the embodiment of the present disclosure, defines a front surface of the electronic device 10 and a display device for input and output is mounted on the first cover 11. Furthermore, it will be exemplified that the second cover 12 defines a rear surface of the electronic device 10 and a battery mounting space is formed in the second cover 12. However, the first cover 11 and the second cover 12 may be configured in the opposite way, and may have various shapes and structures according to the electronic device 10.

A support frame or various modules, for example, an antenna unit and speaker unit, that include the camera apparatus 100 may be mounted in a space between the first cover 11 and the second cover 12, and a main circuit board (not illustrated) may be provided to electrically connect them.

At least a portion of the camera apparatus 100 may be arranged in the space between the first cover 11 and the second cover 12. The camera apparatus 100, according to the present disclosure, may be provided to be exposed to the first cover 11 (e.g., the camera apparatus denoted by 100a of FIG. 1), and may be provided to be exposed to the second cover 12 (e.g., the camera apparatus denoted by 100b of FIG. 1). It will be exemplified that the camera apparatus 100, according to the embodiment of the present disclosure, is exposed through the second cover 12, but it may be mounted to be exposed through the first cover 11.

Figure 4:
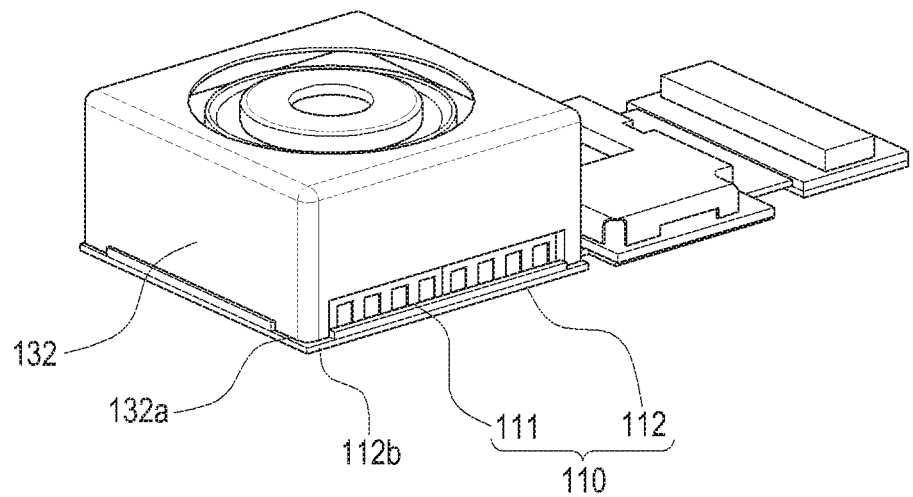
FIG. 4 is a perspective view of a camera apparatus according to an embodiment of the present disclosure.

FIG. 4 is a perspective view of the camera apparatus 100 according to an embodiment of the present disclosure.

Figure 5:
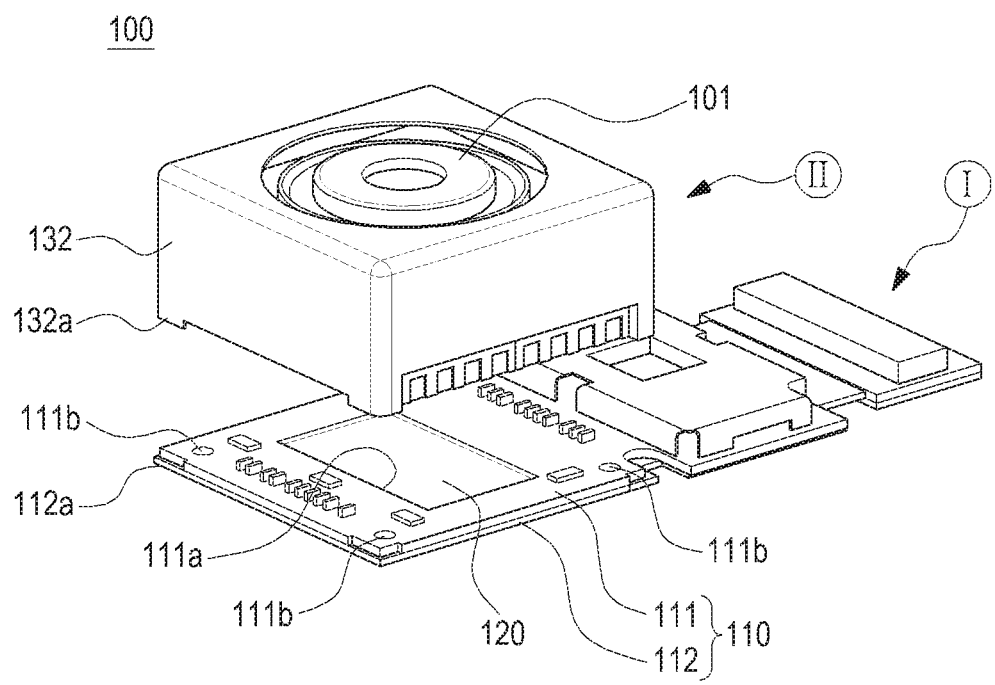
FIG. 5 is a perspective view illustrating a state before a first module and a second module are coupled to each other, in the camera apparatus according to an embodiment of the present disclosure.

FIG. 5 is a perspective view illustrating a state before a first module I and a second module II are coupled to each other, in the camera apparatus 100 according to an embodiment of the present disclosure.

Figure 6:
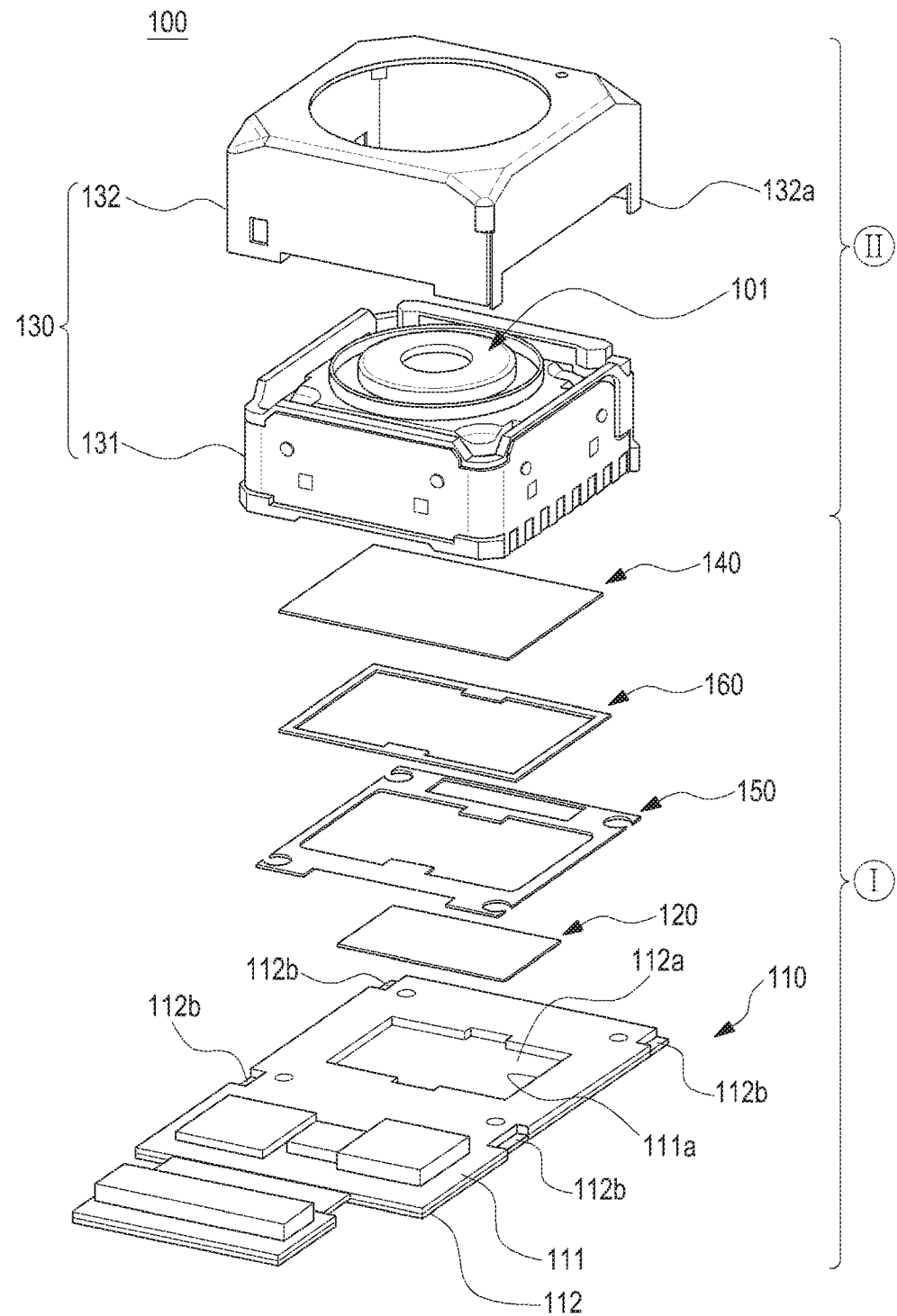
FIG. 6 is an exploded perspective view of the camera apparatus according to an embodiment of the present disclosure.
Figure 7:
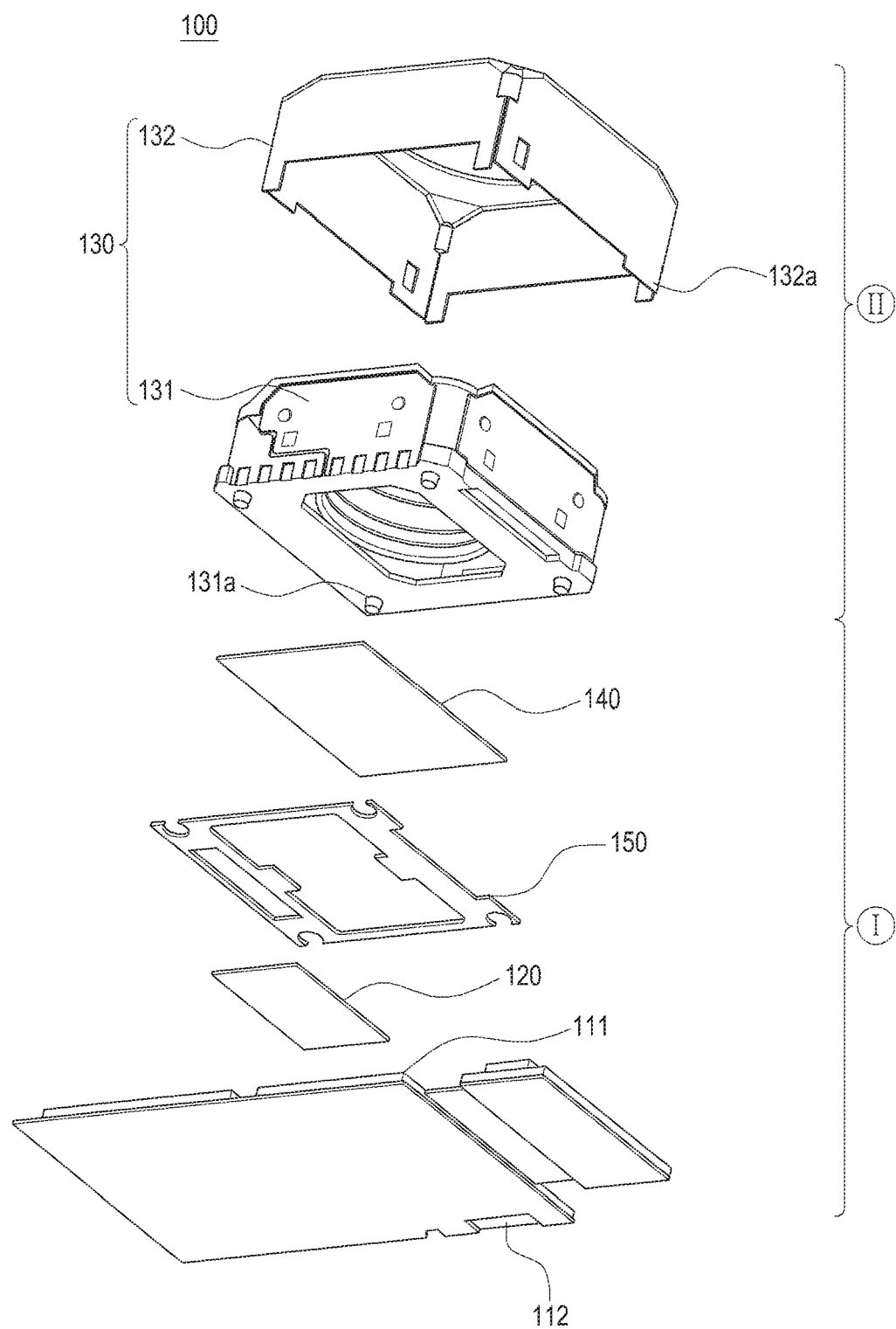
FIG. 7 is an exploded perspective view of the camera apparatus viewed from another side according to an embodiment of the present disclosure.

FIG. 6 is an exploded perspective view of the camera apparatus 100 according to the embodiment of the present disclosure. FIG. 7 is an exploded perspective view of the camera apparatus 100 when viewed from another side according to an embodiment of the present disclosure.

Referring to FIGS. 4 to 7, the camera apparatus 100, according to the embodiment of the present disclosure, may include a lower module (hereinafter, referred to as a first module I), and an upper module (hereinafter, referred to as a second module II) that is assembled separately from the first module I and fixedly mounted on the upper side of the first module I.

The first module I may include a metal plate 112, a board 110 that has a metal plate 112 and a printed circuit board 111, and an image sensor 120 that is mounted on the board 110, and may further include an infrared (IR) filter 140, a bracket 150, and a coupling member 160 that couples the IR filter 140 and the bracket 150.

The second module II is a configuration that is mounted and assembled on the upper side of the first module I, and may include a lens assembly (hereinafter, referred to as a lens assembly 101) in which at least one lens is stacked, and a side surface (hereinafter, referred to as a housing 130) on which the lens assembly 101 is mounted and which is fixedly seated on the upper side of the above-described first module I, that is, on the board 110.

Figure 8:
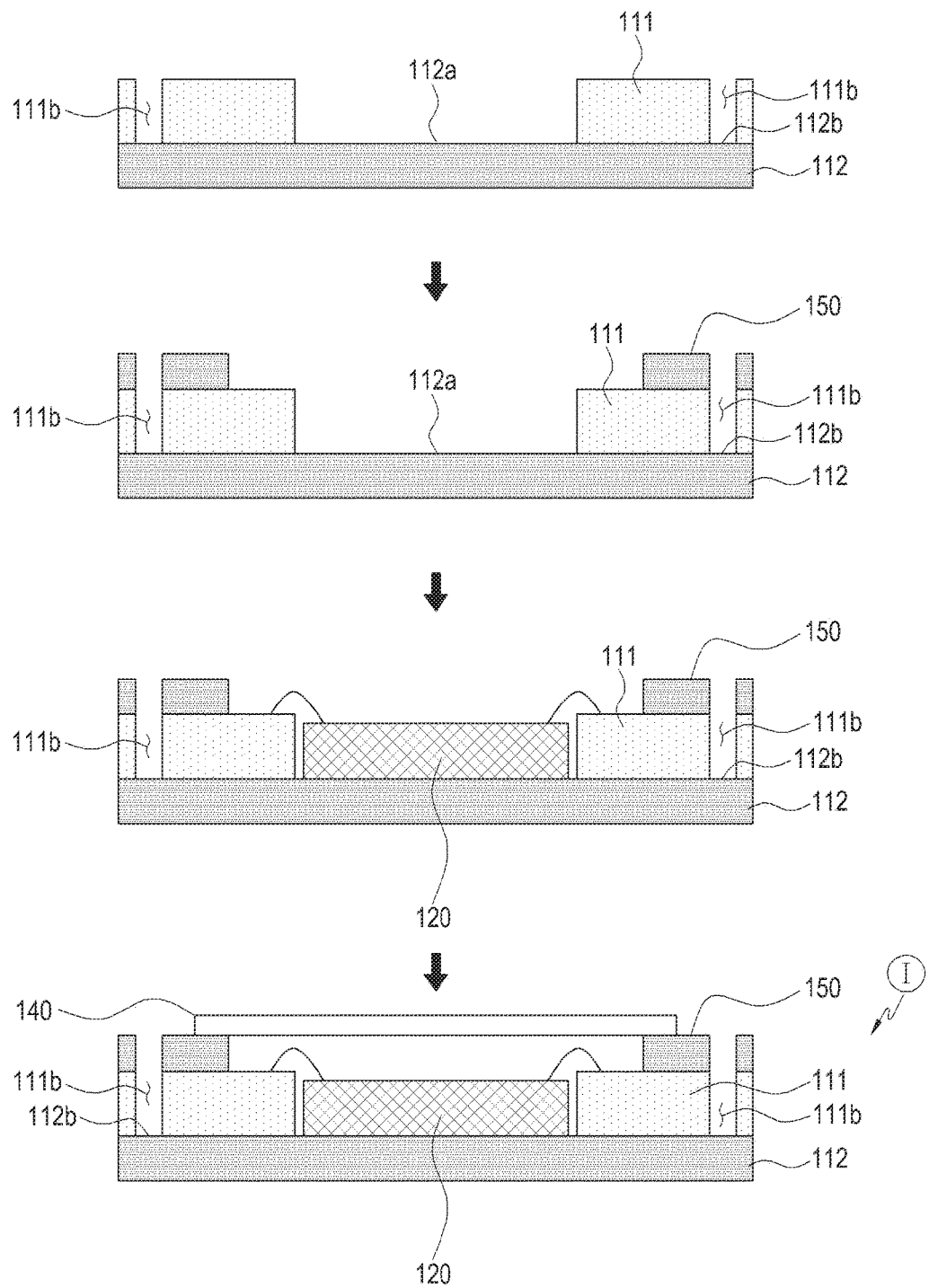
FIG. 8 is a sectional view schematically illustrating an assembly process of the first module in the camera apparatus according to an embodiment of the present disclosure.

FIG. 8 is a sectional view schematically illustrating an assembly process of the first module I in the camera apparatus 100 according to an embodiment of the present disclosure.

Referring to FIG. 8, the first module I may include a metal plate 112, a board 110 that has a printed circuit board 111, and an image sensor 120 that is mounted on the board 110, and may further include an IR filter 140, a bracket 150, and a coupling member 160 that couples the IR filter 140 and the bracket 150.

The board 110 may be electrically connected to the electronic device 10, in detail, to a main circuit board (not illustrated). The board 110 may electrically connect the image sensor 120, which will be described below, and may restrict distortion of the second module II from the first module I when the second module II is assembled on the upper side of the first module I. In detail, the distortion is distortion that may occur when the housing 130 and the board 110 are coupled to each other, as well as coupling distortion that may occur when the image sensor 120 is assembled or distortion due to an inferior surface thereof. In particular, the image sensor 120 may be fixed to a configuration of the board 110, e.g., a surface of the metal plate 112, which will be described below, through a coupling agent such as epoxy. The image sensor 120 coupled to the surface of the metal plate 112 may be electrically connected only to a configuration of the board 110, e.g., the printed circuit board 111, which will be described below. Although not illustrated, the metal plate 112 may be connected to a ground of the printed circuit board 111.

The board 110 may include a printed circuit board 111 and a metal plate 112 that supports the printed circuit board 111.

The printed circuit board 111 may be seated on one flat surface (hereinafter, referred to as an upper surface) of the metal plate 112, and may be mounted to be supported on the metal plate 112. The printed circuit board 111 may be electrically connected to the image sensor 120, which will be described below, and may be provided to digitally process an image signal output from the image sensor 120. A connection circuit board that extends from the printed circuit board 111 is provided on one side of the printed circuit board 111, and may be electrically connected to a main circuit board of the electronic device, on which the camera apparatus 100 is mounted.

The printed circuit board 111 may have an opening (hereinafter, referred to as a first opening 111a) that is offset to pass through upper and lower surfaces of the printed circuit board 111 such that the image sensor 120, which will be described below, passes through the printed circuit board 111 to be mounted on an upper surface of the metal plate 112. The first opening 111a may be arranged substantially at the center of the printed circuit board 111. It has been exemplified that the first opening 111a, according to the present disclosure, is arranged at the center of the printed circuit board 111, but the first opening 111a may be arbitrarily changed and modified according to the mounting location of the image sensor 120 that depends on the shape and structure of the camera apparatus 100. Because the first opening 111a passes through the upper and lower surfaces of the printed circuit 111, a portion of an upper surface of the metal plate 112 corresponding to the first opening 111a may be exposed if the printed circuit board 111 is mounted on the upper surface of the metal plate 112. Accordingly, the image sensor 120, which will be described below, may be mounted on the upper surface of the metal plate 112, which will be described below, through the inner side of the first opening 111a.

It will be exemplified that the printed circuit board 111 is a single-layered board in the embodiment of the present disclosure, but the present disclosure is not limited thereto. For example, the printed circuit board 111 may be formed by stacking multiple substrates including connection pads on an insulation layer. The printed circuit board 111 may be at least one of a ceramic substrate, a metal substrate, and a fusible metal, and various components (not illustrated) are mounted on the printed circuit board 111 in order to process an image signal that is converted through the image sensor 120.

The printed circuit board 111 may have through-holes (hereinafter, referred to as second openings 111b) in which the housing 130, which will be described below, in detail, coupling ends 131a of the housing 130 make contact with a surface of the metal plate 112 to be fixed thereto, as well as the first opening 111a in which the image sensor 120 is seated. The second openings 111b may be arranged outside the first opening 111a.

It may be exemplified that the mounting locations of the second openings 111b, according to the embodiment of the present disclosure, have two structures.

First, as illustrated in FIG. 5, the second openings 111b, according to the first embodiment of the present disclosure, may be arranged around the first opening 111a, and may be provided between the first opening 111a and an end of the printed circuit board 111 to correspond to the housing 130, specifically, to the coupling ends 131a of the housing 130, which will be described below. Because the coupling ends 131a, which will be described below, pass through the second openings 111b and are seated on and engaged with end seating surfaces 112b, tilting of the housing 130 is restricted when the housing is assembled on the board 110, and the lens assembly 101 forms the same axis as that of the image sensor 120 and also forms the same axis as an optical axis of the lens assembly 101. The second openings 111b may be offset to a surface of the metal plate 112 at at least a portion between the outside of the first opening 111a and an inner periphery of the printed circuit board 111. Accordingly, the coupling ends 131a may contact with a surface of the metal plate 112 to be fixed.

Figure 9:
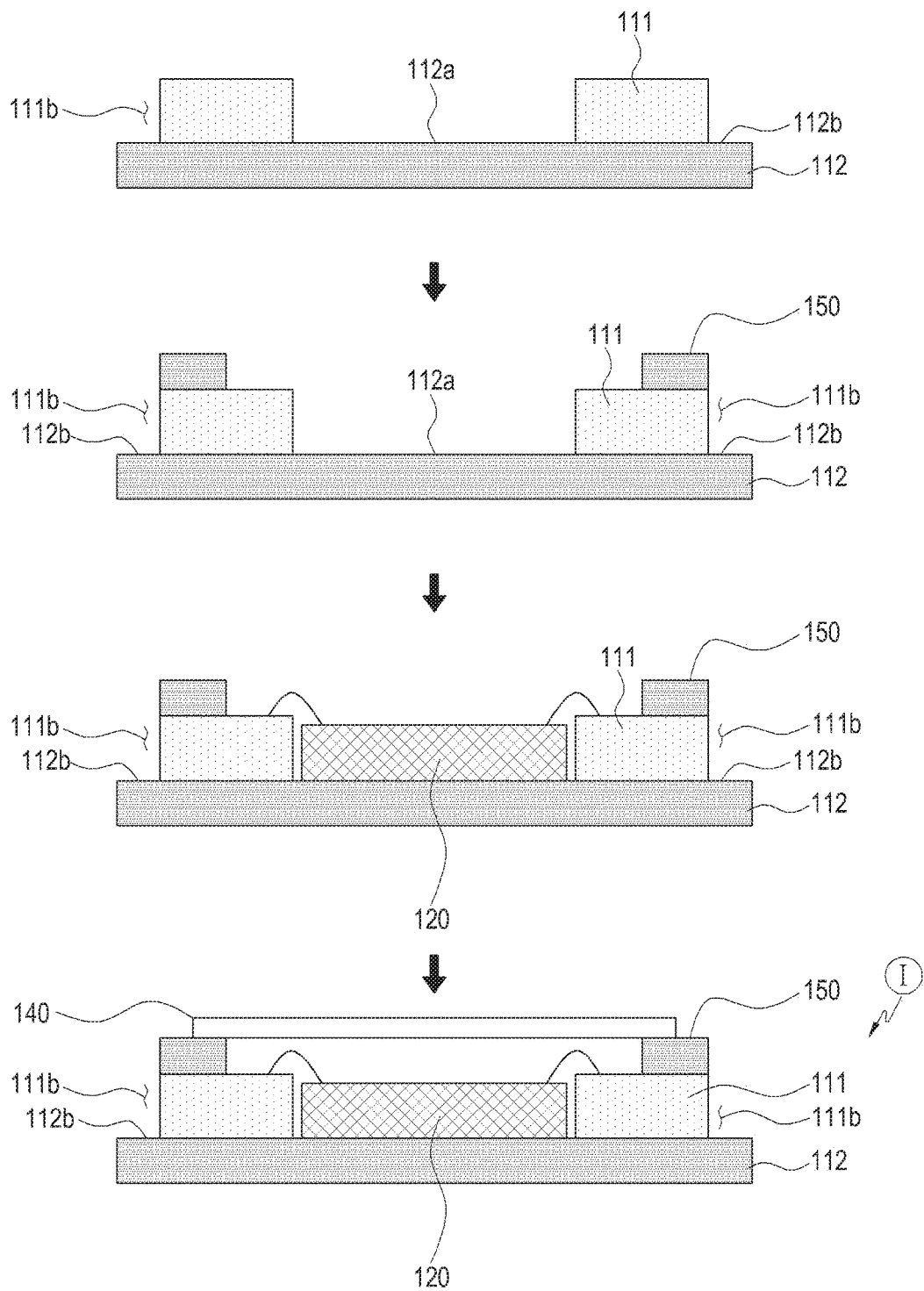
FIG. 9 is a view illustrating a second opening in the camera apparatus according to an embodiment of the present disclosure.

FIG. 9 is a view illustrating the second openings in the camera apparatus according to an embodiment of the present disclosure.

Referring to FIG. 9, the second openings 111b may offset at least a portion of the periphery of the printed circuit board 111 along the periphery of the printed circuit board 111 such that at least a portion of the periphery of the metal plate 112 is exposed.

The locations of the second openings 111b may be provided at locations where the second openings 111b are engaged with the coupling ends 131a to correspond to the coupling ends 131a. As mentioned above, the coupling ends 131a may pass through the second openings 111b to be seated on end seating surfaces 112b. Because the coupling ends 131a pass through the second openings 111b and are seated on and engaged with the end seating surface 112b, tilting of the housing 130 is restricted when the housing 130 is assembled on the board 110, and the lens assembly 101 forms the same axis as that of the image sensor 120 and also forms the same axis as an optical axis of the lens assembly 101. The second opening 111b may be offset to a surface of the metal plate 112 such that ends of the housing 130; that is, the coupling ends 131a make contact with the surface of the metal plate 112 to be fixed.

The metal plate 112 may be arranged substantially parallel to the first cover 11, and may be provided such that one surface of the metal plate 112, on which ends of the image sensor 120 and the housing 130 are mounted, has a predetermined flatness. The printed circuit board 111 may be mounted on one surface of the metal plate 112 to be supported by the surface of the metal plate 112. The metal plate 112 may be connected to a ground of the printed circuit board 111. If the printed circuit board 111 is mounted on the upper surface of the metal plate 112, the first opening 111a of the printed circuit board 111 is exposed to the outside, and the image sensor 120 may be mounted on the exposed surface (hereinafter, referred to as a sensor seating surface 112a) of the metal plate 112. Because the image sensor 120 is mounted on a surface of the metal plate 112 having a uniform flatness, it may be mounted to be exactly perpendicular to the optical axis. That is, because the image sensor 120 may be mounted on the flat board 110, which is on the surface of the metal plate 112, and may be assembled such that the image sensor 120 maintains flatness in an assembly process in which the image sensor 120 is mounted on the board 110, an image introduced onto the image sensor 120 may have the same axis as the optical axis, and accordingly, the image sensor 120 can be restrained from being distorted from the board 110 when the first module I is assembled.

The metal plate 112 may be mounted on a lower surface of the printed circuit board 111 to support the printed circuit board 111. The metal plate 112 has a uniform flatness, and the image sensor 120 and the housing 130 may be coupled to a surface of the metal plate 112. It will be exemplified that the metal plate 112 is formed of a metallic material to secure flatness while supporting and reinforcing the printed circuit board 111. However, the material of the metal plate 112 is not limited to a metal, and may be a material that is flat while reinforcing and supporting the printed circuit board 111; for example, a material such as a plastic plate, an epoxy plate, a ceramic plate, an injection-molded plastic, or a glass fiber foam plate (FR4).

If the printed circuit board 111 is mounted on the metal plate 112, a sensor seating surface 112a located at a location corresponding to the first opening 111a and end seating surfaces 112b located at locations corresponding to the second opening 111b may be exposed from a surface of the metal plate 112.

The image sensor 120, which will be described below, may be mounted on the sensor seating surface 112a to make contact with the sensor seating surface 112a, and coupling ends of the housing 130, which will be described below, may be mounted to make contact with the end seating surfaces 112b.

Because the image sensor 120 and the housing 130 are seated and mounted on the surface of the metal plate 112 having a uniform flatness, the image sensor 120 may be mounted on the board 110 while having a uniform flatness and the housing 130 may also be mounted on the board 110 while having a uniform flatness. Because the image sensor 120 is mounted on the board 110, in particular, on the upper surface of the metal plate 112 having a uniform flatness, the distortion of the image sensor 120 can be mitigated when being mounted on the board 110, and also can be restrained from being distorted from the optical axis in the process of assembling the first module I. Further, because the coupling ends 131a of the housing 130 is mounted on the metal plate 112, on which the image sensor 120 is mounted, it may be seated on a surface having the same flatness as the image sensor 120.

That is, because the image sensor 120 is mounted on the upper surface of the metal plate 112 having flatness, it may be substantially parallel to the upper surface of the metal plate 112. Further, because the housing 130 is also mounted on the surface of the metal plate 112 to have the same axis as that of the image sensor 120, the image sensor 120 may have the same axis as the optical axis and the lens assembly 101 may have the same axis as the optical axis after the first module I and the second module II are assembled. Accordingly, the housing 130 including the lens assembly 101 can be restrained from being distorted from the board 110, and accordingly, the housing 130 on which the lens assembly 101 is mounted, can be restrained from being distorted in the process of assembling the second module II on the first module I.

Because the image sensor 120 is mounted on the upper surface of the metal plate having flatness, it may be substantially parallel to the upper surface of the metal plate 112. In the camera apparatus according to the second embodiment of the present disclosure, the image sensor can have the same axis as the optical axis and the lens assembly can also be assembled to have the same axis as the optical axis in the state in which the first module and the second module are assembled because the housing is also mounted on the surface of the metal plate to have the same axis as that of the image sensor even though the metal plate is mounted and arranged in a state in which the metal plate is tilted at a predetermined angle as a whole, while the surface of the printed circuit board is not uniform.

The image sensor 120 is adapted to convert light that is reflected by a subject and received by the image sensor into an image signal, and may be any one of a complementary metal-oxide semiconductor (CMOS) and a charge coupled device (CCD).

The image sensor 120, according to the present disclosure, may pass through the inner side of the first opening 111a of the printed circuit board 111, and may be mounted on the surface of the metal plate 112, that is, the sensor seating surface 111a while making contact with the sensor seating surface 111a. The printed circuit board 111 may be electrically connected to a surface of the printed circuit board 111 located around the image sensor 120 through a flip chip manner or a wire bonding manner while being seated on the sensor seating surface 112a inside the first opening 111a.

As described above, because the image sensor 120 is mounted on the surface of the metal plate 112 having a surface flatness, that is, the sensor seating surface 112a through the inner side of the first opening 111a, it may have the same axis as the optical axis. Accordingly, because the image sensor 120 may be restrained from being tilted from the optical axis in the process of assembling the first module I, the assembly reliability of the first module I can be improved and, accordingly, the yield rate of the first module I can be enhanced.

Figure 10:
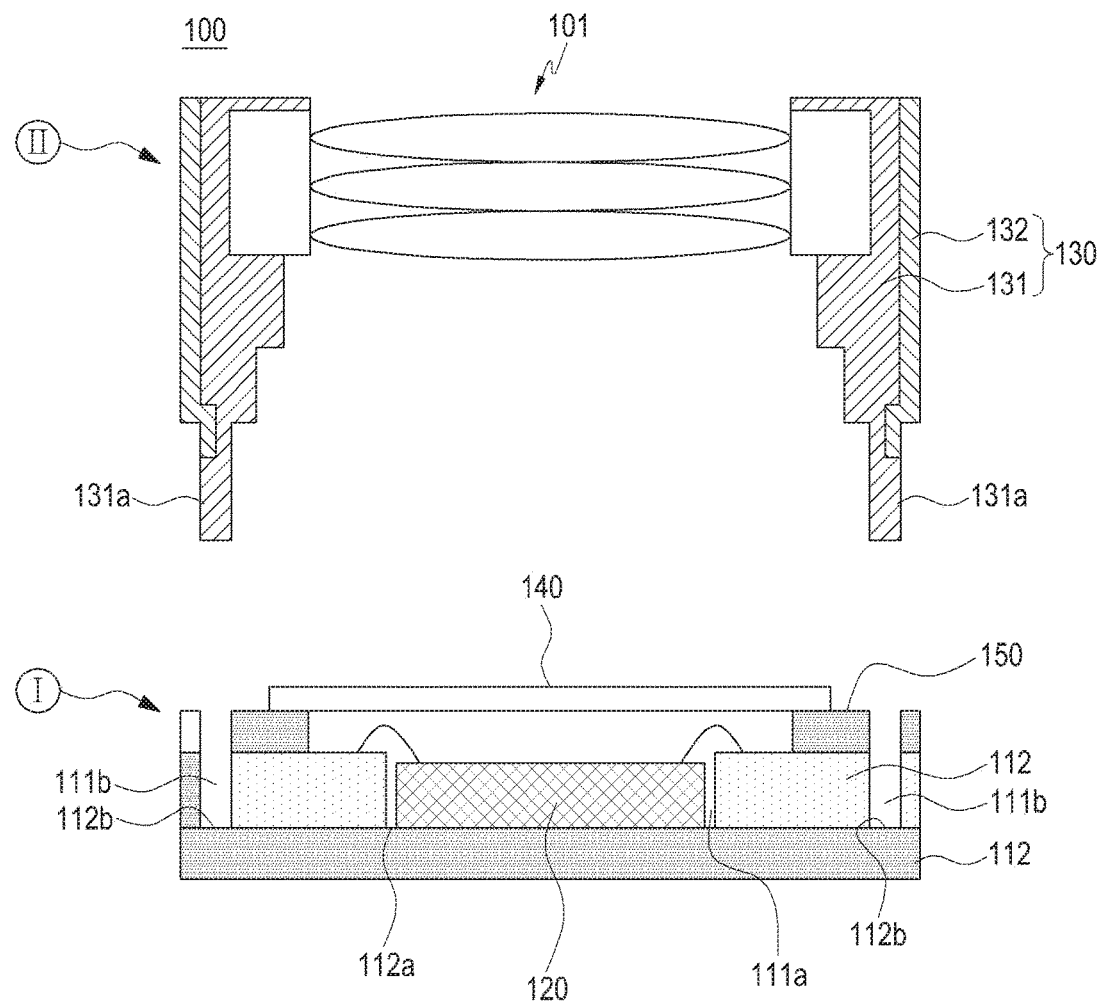
FIG. 10 is a sectional view of a state before a first module and a second module are coupled to each other in a camera apparatus according to a first embodiment of the present disclosure.

FIG. 10 is an enlarged view of a coupled state of the bracket 150 provided between the printed circuit board 111 and the IR filter 140 in the camera apparatus 100 according to an embodiment of the present disclosure.

Referring to FIG. 10, the IR filter unit 140, according to the embodiment of the present disclosure, is a configuration that is mounted on the upper side of the printed circuit board 111 and is assembled when the first module I is assembled. A bracket 150 may be provided between the printed circuit board 111 and the IF filter unit 140. The bracket 150 may be mounted between a periphery of the first opening 111 and the IR filter unit 140, along a periphery of the first opening 111a, so as to support the IR filter unit 140 and provide strength for the IR filter unit 140. The bracket 150 may have a hole at a location corresponding to the first opening 111a, and may be fixed along the periphery of the first opening 111a through a bonding member or the like. The bracket 150 may have a predetermined height. The bracket 150 may be formed of a strong material; for example, a metal. Because the bracket 150 is formed of a strong material the IR filter 140 may be restrained from being deflected or deformed on the printed circuit board 111. The bracket 150 is assembled to cover the first opening 111a during a process for the first module I. Accordingly, foreign substances can be interrupted from being introduced into the image sensor 120 during an assembly process for assembling the first module I and the second module II.

A coupling member 160 may be provided between the bracket 150 and the upper surface of the printed circuit board 111. The coupling member 160 may include at least on of a double-sided tape, an adhesive, and epoxy.

Hereinafter, the assembly process for the second module II will be described (see FIGS. 5, 6, 7, 11, 13, and 15).

The second module II may include a housing 130 and a lens assembly 101.

It may be exemplified that the housing 130 may surround at least a portion of the lens assembly 101 and the image sensor 140, and the housing 130, according to the present disclosure, may have a rectangular shape, of which the upper and lower sides are opened.

At least one lens may be stacked in the lens assembly 101, which may be accommodated inside the housing 130.

A drive member (not illustrated) may be provided in the interior of the housing 130 to drive the lens assembly 101 in the direction of an optical axis. The drive member may include a voice coil motor (VCM), a piezoelectric actuator, or a shape memory alloy to correct distortion of the lens assembly 101 while the lens assembly 101 is driven.

The housing 130, according to an embodiment of the present disclosure, may include a first body 131 and a second body 132. The first body 131 may have at least one lens assembly 101 and a drive member therein, and is configured such that light reflected by a subject is introduced through the lens assembly 101 and received by the image sensor 120.

The second body 132 is provided on an outer surface of the first body 131, and may be provided to increase the strength of the first body 131.

The first body 131, according to the embodiment of the present disclosure, may be assembled by injection-molding a material such as plastic, and the second body 132 may be assembled through dual injection-molding into the first body 131 or by pressing the second body 132 against the first body 131.

Coupling ends 131*a* may be provided at an end of the housing 130 to be seated on the board 110, specifically, end seating surfaces 112*b* of the metal plate 112.

The coupling ends, according to various embodiments of the present disclosure, may be exemplified to have three types. Hereinafter, the three types of the coupling ends and the assembly of the first module and the second module will be described with reference to FIGS. 11 to 17.

Figure 11:
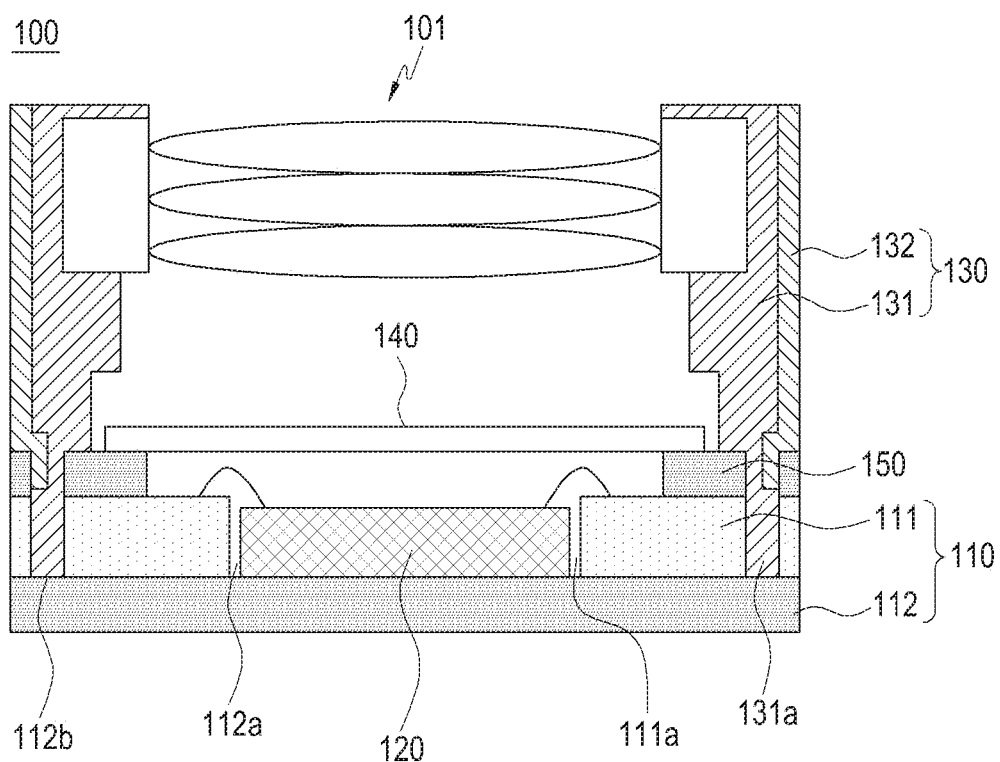
FIG. 11 is a sectional view of a state in which the first module and the second module are coupled to each other in a camera apparatus according to a first embodiment of the present disclosure.

FIG. 11 is a sectional view illustrating a state before the first module I and the second module II are coupled to each other, in the camera apparatus 100 according to a first embodiment of the present disclosure.

Figure 12:
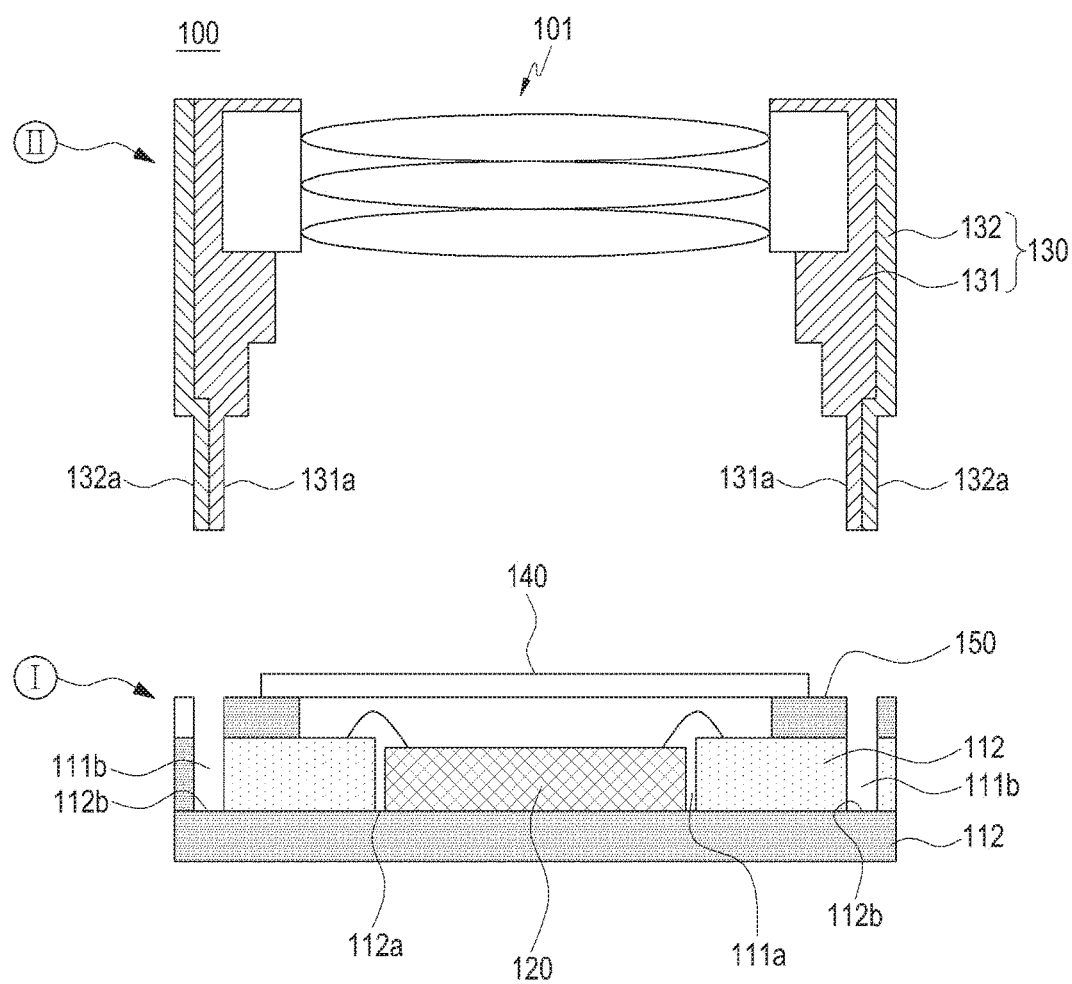
FIG. 12 is a sectional view of a state before a first module and a second module are coupled to each other according to a second embodiment of the present disclosure.

FIG. 12 is a sectional view of a state in which the first module and the second module are coupled to each other in the camera apparatus 100 according to a first embodiment of the present disclosure;

Referring to FIGS. 11 and 12, as mentioned above, the assembly process of the first module I may be finished by arranging the printed circuit board 111 having the first opening 111*a* and the second openings 111*b* on the metal plate 112, by mounting the image sensor 120 on the sensor seating surface 112*a* through the first opening 111*a* in order to make an image, which is introduced into the image sensor 120, the same axis as an optical axis by electrically connecting the printed circuit board 111 and the image sensor 120, and by mounting the IR filter 140 with the bracket 150 provided at a periphery of the first opening 111*a*.

Separately from the first module I, the second module II, on which the lens assembly 101 and the drive member are mounted, may be assembled inside the first body 131 having the second body 132 on an outer surface thereof.

Then, the coupling ends 131*a* protrude from the bottom surface of the first body 131 to pass through the second openings 111*b* and be fixedly engaged with the end seating surfaces 112*b* of the metal plate 112. That is, the coupling ends 131*a*, according to the first embodiment of the present disclosure, are configured such that ends of the first body 131 make contact with the end seating surfaces 112*b* to be fixed.

It has been exemplified that one or more coupling ends 131*a*, according to the first embodiment of the present disclosure, protrude from the bottom surface of the first body 131, but the present disclosure is not limited thereto. For example, as in the second embodiment of the present disclosure, which will be described below, the coupling ends 132*a* may protrude from an end of the second body 132. Accordingly, the coupling ends 132*a* protruding from the end of the second body 132 may pass through the second openings 111*b* to be fixed to the end seating surfaces 112*b*. Furthermore, alternatively, as in a third embodiment of the present disclosure, which will be described below, the coupling ends 131*a* and 131*b* may be configured that that a boss (hereinafter, referred to as a first coupling end 131*a*) protruding from an end of the first body 131 and a boss (hereinafter, referred to as a second coupling end 132*a*) protruding from an end of the second body 132 coupled to an outer surface of the first coupling end 131*a*. Accordingly, the first and second ends 131*a* and 132*a* pass through the second opening 111*b* to be fixedly engaged with the end seating surfaces 112*b* of the metal plate 112.

The second module II may be fixed to a set coupling location of the first module I while the coupling ends 131*a* are engaged with the end seating surfaces 112*b*, and the housing 130, in particular, the lens assembly 101 can be restrained from being distorted from the image sensor 120. That is, as the housing 130 is located on the upper surface of the metal plate 112 that is flat during a process of coupling the second module II and the first module I, an image introduced through the lens assembly 101 may have the same axis as the optical axis because distortion of the lens assembly 101 on the board 110 can be mitigated when being coupled and the lens assembly 101 can be stacked in parallel to the image sensor 120 mounted on the metal plate 112.

Figure 13:
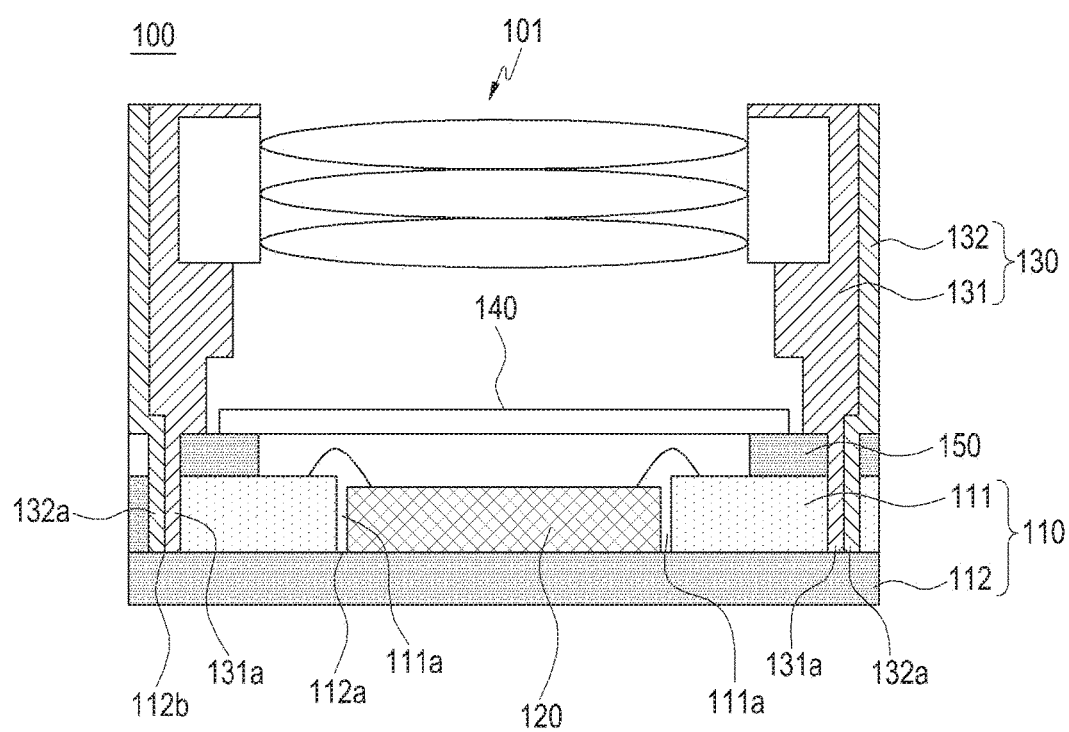
FIG. 13 is a sectional view of a state in which the first module and the second module are coupled to each other in a camera apparatus according to a second embodiment of the present disclosure.

FIG. 13 is a sectional view illustrating a state before the first module I and the second module II are coupled to each other, in the camera apparatus 100 according to a second embodiment of the present disclosure.

Figure 14:
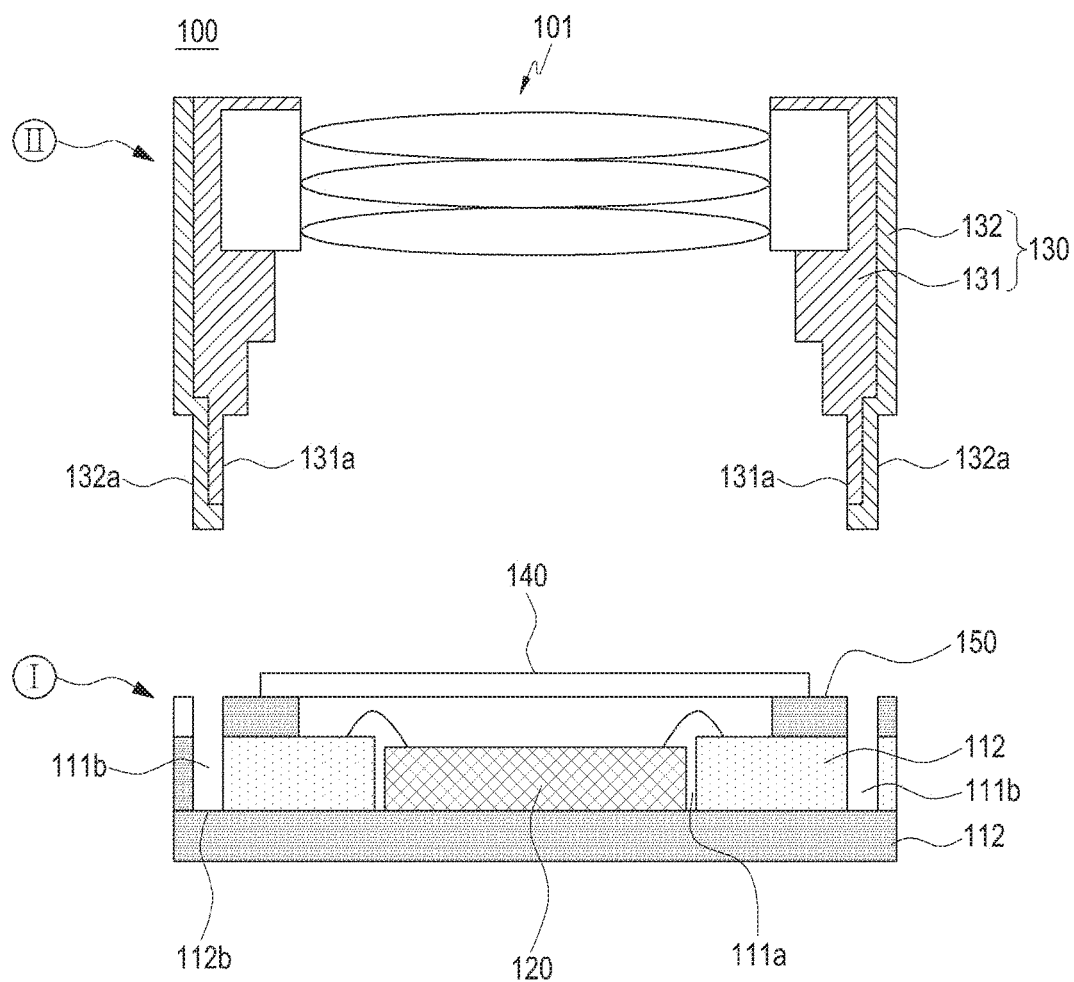
FIG. 14 is a sectional view of a state before a first module and a second module are coupled to each other in a camera apparatus according to a third embodiment of the present disclosure.

FIG. 14 is a sectional view a state in which the first module and the second module are coupled to each other in the camera apparatus 100 according to a second embodiment of the present disclosure.

Referring to FIGS. 13 and 14, the coupling ends 132*a*, according to the second embodiment of the present disclosure, protrude from an end of the second body 132 as mentioned above. That is, the coupling ends 131*a*, according to the first embodiment of the present disclosure, protrude from the bottom surface of the first body 131, but the coupling ends 132*a*, according to the second embodiment of the present disclosure, protrude from an end of the second body 132 and the end of the second body 132 passes through the second openings 111*b* and makes contact with the end seating surfaces 112*b* to be fixed.

In the second embodiment of the present disclosure, the second module II may be fixed to a set coupling location of the first module I while the coupling ends 132*a* are engaged with the end seating surfaces 112*b*, and the housing 130, in particular, the lens assembly 101 can be restrained from being distorted from the image sensor 120. That is, as the housing 130 is located on the upper surface of the metal plate 112 that is flat during a process of coupling the second module II and the first module I, an image introduced through the lens assembly 101 may have the same axis as the optical axis because distortion of the lens assembly 101 on the board 110 can be mitigated while being coupled and the lens assembly 101 can be stacked in parallel to the image sensor 120 mounted on the metal plate 112.

Furthermore, because the second body 132, according to the second embodiment of the present disclosure, may be covered to an end of the first body 131 and the coupling ends 132*a* make contact with the metal plate 112 to be fixed, distortion or deformation of the second body 132 can be mitigated while covering the first body 131 even though an impact is applied to the camera apparatus 100.

Figure 15:
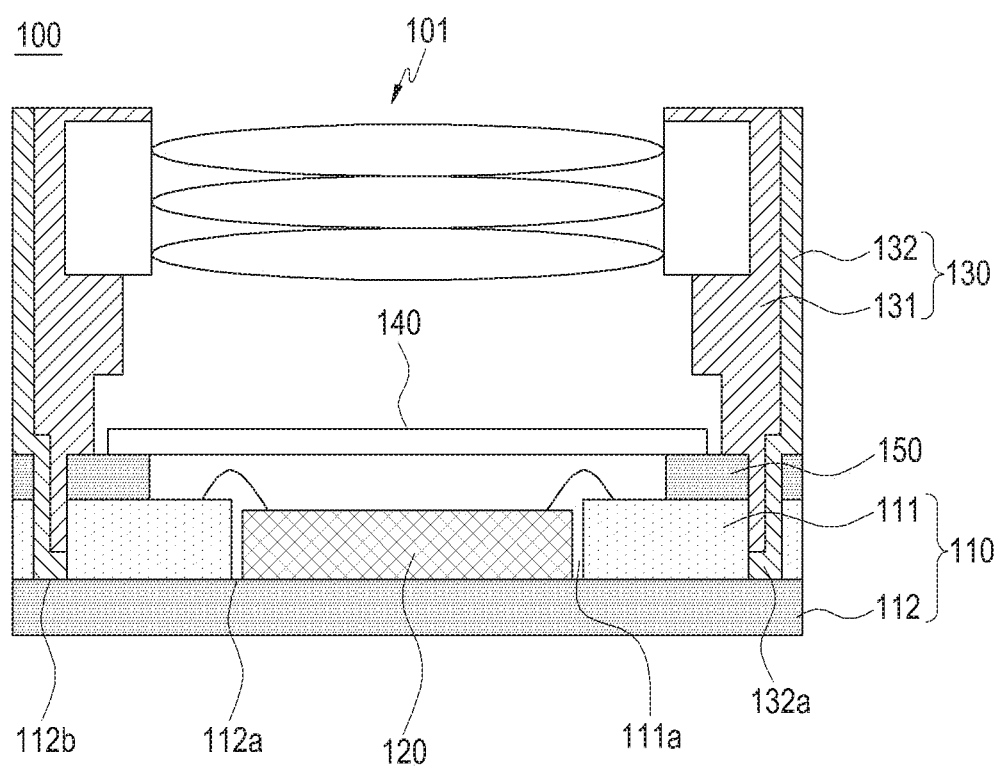
FIG. 15 is a sectional view of a state in which the first module and the second module are coupled to each other in a camera apparatus according to a third embodiment of the present disclosure.

FIG. 15 is a sectional view illustrating a state before the first module I and the second module II are coupled to each other, in the camera apparatus 100 according to a third embodiment of the present disclosure.

Figure 16:
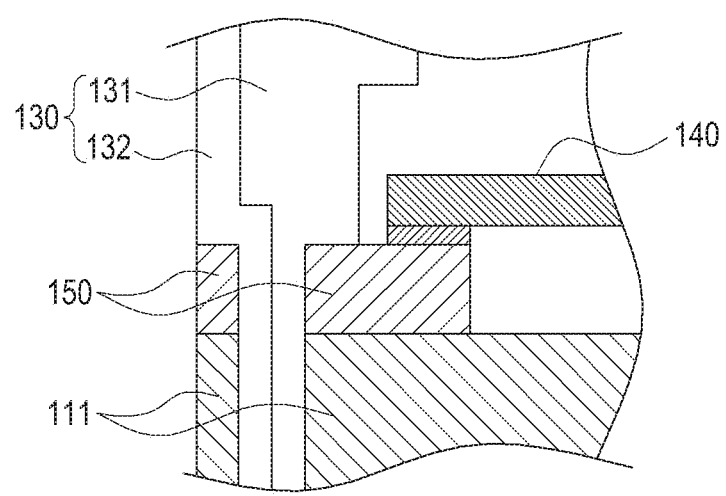
FIG. 16 is a sectional view a state in which the first module and the second module are coupled to each other in the camera apparatus according to a second embodiment of the present disclosure.

FIG. 16 is a sectional view a state in which the first module and the second module are coupled to each other in the camera apparatus 100 according to a second embodiment of the present disclosure.

Referring to FIGS. 15 and 16, the coupling ends 132*a*, according to the second embodiment of the present disclosure, protrude from an end of the second body 132 as mentioned above. That is, while the coupling ends 131*a*, according to the first embodiment of the present disclosure, protrude from the bottom surface of the first body 131 and the coupling ends 132*a*, according to the second embodiment of the present disclosure, protrude from an end of the second body 132, the coupling ends 131*a* and 132*a* according to the third embodiment of the present disclosure protrude from ends of the first body 131 and the second body 132, respectively, such that the end of the first body 131*a* and the end of the second body 132 pass through the second openings 111*b* and make contact with the end seating surfaces 112*b* to be fixed. In detail, a first coupling end 131*a* protrudes from an end of the first body 131, and a second coupling end 132*a* protrudes from an end of the second body 132 to be coupled to an outer surface of the first coupling end 131*a*.

In the third embodiment of the present disclosure, the second module II may be fixed to a set coupling location of the first module I while the coupling ends 131*a* and 132*a*, which protrude from ends of the first body 131 and the second body 132 to be coupled, are engaged with the end seating surfaces 112*b*, and the housing 130, in particular, the lens assembly 101 can be restrained from being distorted from the image sensor 120. That is, as the housing 130 is located on the upper surface of the metal plate 112 that is flat during a process of coupling the second module II and the first module I, an image introduced through the lens assembly 101 may have the same axis as the optical axis because distortion of the lens assembly 101 on the board 110 can be mitigated while being coupled and can be stacked in parallel to the image sensor 120 mounted on the metal plate 112.

The second body 132 is provided on an outer surface of the first body 131, and may be provided to cover the first body 131. The coupling end 132*a* may protrude from an end of the second body 132. The coupling ends 132*a* are provided to cover even an end of the first body 131 and pass through the second openings 111*b* of the printed circuit board 111, and may make contact with a surface of the metal plate 112, that is, the end seating surfaces 112*b*, to be fixed.

Furthermore, because the second body 132, according to the embodiment of the present disclosure, may be covered to an end of the first body 131 and the coupling ends 132*a* make contact with the metal plate 112 to be fixed, distortion or deformation of the second body 132 can be mitigated while covering the first body 131.

Hereinafter, a camera apparatus, according to the second embodiment of the present disclosure, and an electronic device including the same will be described with reference to FIGS. 17 to 19.

Figure 17:
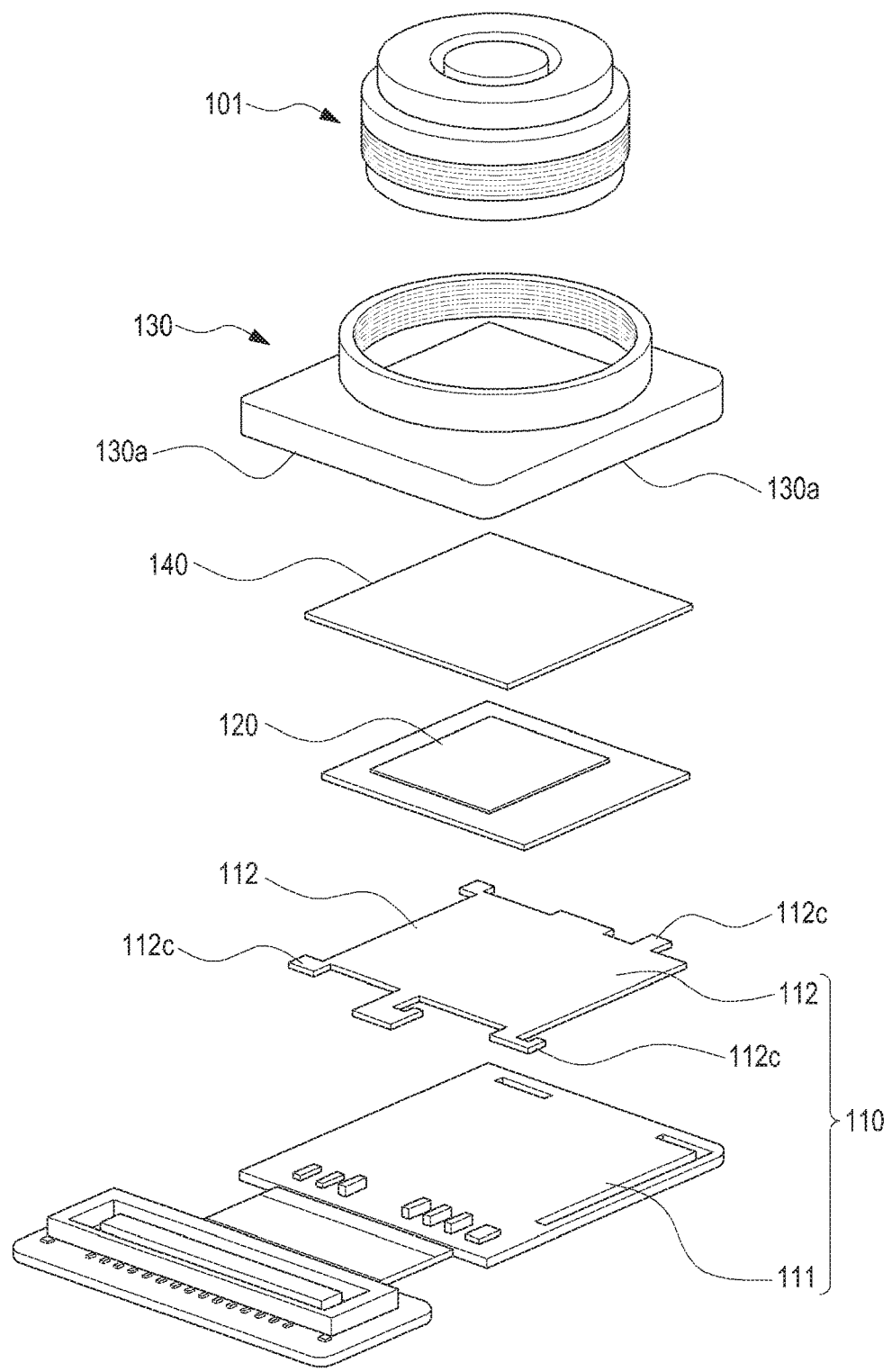
FIG. 17 is an exploded perspective view of the camera apparatus according to a second embodiment of the present disclosure.

FIG. 17 is an exploded perspective view of the camera apparatus according to a second embodiment of the present disclosure.

Figure 18:
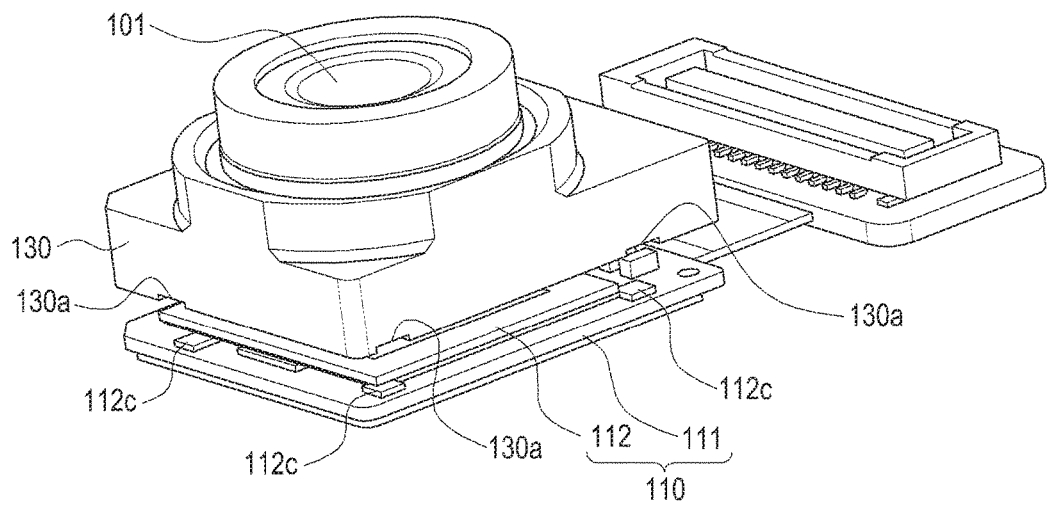
FIG. 18 is a perspective view illustrating a state before a first module and a second module are coupled to each other, in the camera apparatus according to a second embodiment of the present disclosure.

FIG. 18 is a perspective view illustrating a state before a first module and a second module are coupled to each other, in the camera apparatus according to a second embodiment of the present disclosure.

Figure 19:
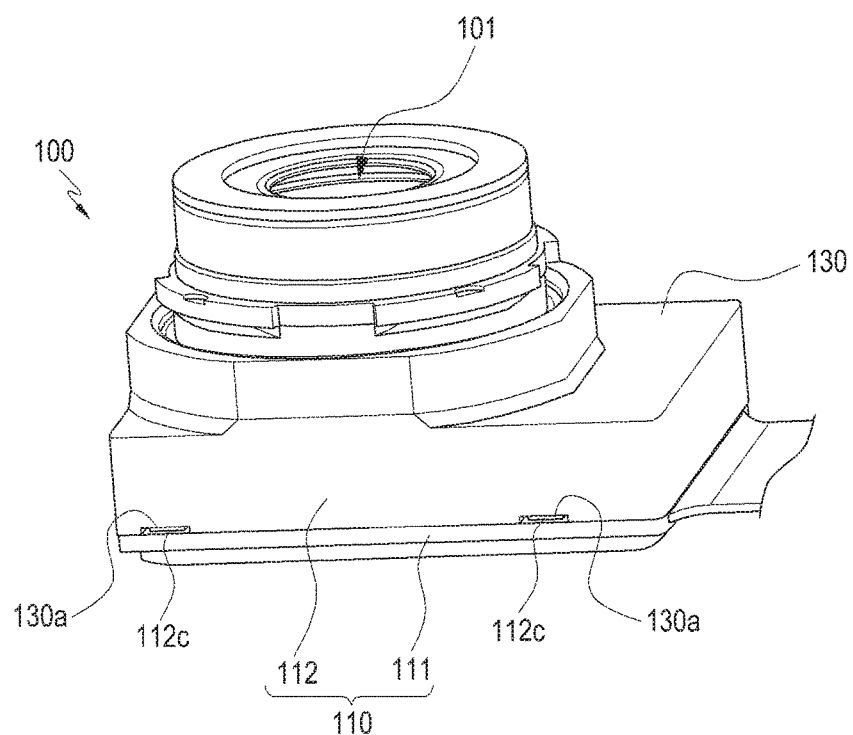
FIG. 19 is a perspective view illustrating a state in which the first module and the second module are coupled to each other, in the camera apparatus according to a second embodiment of the present disclosure.

FIG. 19 is a perspective view illustrating a state in which the first module and the second module are coupled to each other in the camera apparatus according to a second embodiment of the present disclosure.

Referring to FIGS. 17 to 19, the camera apparatus 100 and the electronic device 10 including the same, according to the second embodiment of the present disclosure, are similar to the electronic device 10 according to the preceding embodiments of the present disclosure and the camera apparatus 100. Meanwhile, a stack state of the camera apparatus 100 and a coupling structure resulting from the stack state are different. In detail, the stack state of the first module I and the coupling structure of the second module II coupled to the first module I are different. Accordingly, hereinafter, the configurations and structures that are different from those of the camera apparatus 100 and the electronic device 10, which have been described above, will be described, and the same configuration and structure will be omitted.

The electronic device 10, according to the second embodiment of the present disclosure, may include a first cover 11, a second cover, 12, a battery cover 13, and a camera apparatus 100, and the configurations and shapes of the first cover 11 and the second cover 12 will be omitted.

The camera apparatus 100 may include a first module I, and a second module II that is assembled on the first module I. The first module I, according to the second embodiment of the present disclosure, may include a metal plate 112, a board 110 that has a printed circuit board, and an image sensor 120 that is mounted on the board 110, and may further include an IR filter 140, a bracket 150, and a coupling member 160 that couples the IR filter 140 and the bracket 150.

The board 110 may be electrically connected to the electronic device 10, specifically, to a main circuit board (not illustrated). The board 110 may electrically connect the image sensor 120, which will be described below, and may restrict distortion of the second module II from the first module I when the second module II is assembled on the upper side of the first module I (e.g., distortion that may occur when the housing 130 and the substrate 110) are coupled to each other, as well as coupling distortion that may occur when the image sensor 120 is assembled or distortion due to an inferior surface thereof.

In detail, in the stack state of the first module I, according to the second embodiment of the present disclosure, the board 110 is configured such that the metal plate 112 having flatness is mounted on the printed circuit board 111, and the image sensor 120 is mounted on the stacked board 110, that is, on the upper surface of the metal plate 112.

A protruding surface 112c may be provided at at least an outer portion of the metal plate 112. The protruding surface 112c may be provided to make contact with a depressed portion 130a of the housing 130, which will be described below. Accordingly, when the housing 130 is seated and assembled on the board 110, the depressed portion 130a may make contact the protruding surface 112c. Because the housing 130 is coupled to a surface of the metal plate 112, the housing 130 may be stacked to cover a periphery of the image sensor 120 with respect to an optical axis.

Furthermore, the bracket 150 may be provided to support the IF filter unit 140. The bracket 150 is provided around the image sensor 120, and may be provided between the printed circuit board 111 and the IR filter unit 140 such that the IR filter unit 140 is stacked on the image sensor 120. Although not illustrated, as in the camera apparatus 100 according to the above-described first embodiment of the present disclosure, a bracket may be mounted on the camera apparatus 100 according to the second embodiment of the present disclosure between the board 110, specifically, a surface of the printed circuit board 111 and the IR filter unit 140 to support the IR filter unit 140. The bracket may be provided to surround the image sensor 120 along a periphery of the image sensor 120. The structure and stack shape of the IR filter unit 140 have been described in detail in the preceding embodiments of the present disclosure, and a description thereof may be omitted.

As described above, because the image sensor 120 is mounted on the upper surface of the flat metal plate, it may be substantially parallel to the upper surface of the metal plate 112. Accordingly, if the image sensor 120 is attached to the metal plate 112, a photographed image introduced onto the image sensor 120 may substantially coincide with an optical axis direction. Furthermore, in the camera apparatus 100 according to the second embodiment of the present disclosure, the lens assembly 101 and the image sensor 120 may be arranged substantially parallel to each other if the depressed portion 130a makes contact with the protruding surface 112c such that the housing 130 is fixed onto the board even though the metal plate 112 is mounted while a surface of the printed circuit board 111 is not uniform such that the metal plate 112 is tilted at a predetermined angle as a whole. Accordingly, a photographed image introduced onto the camera apparatus 100 may substantially coincide with the optical axis direction. That is, because the housing 130 is also mounted on the surface of the metal plate 112 to have the same axis as that of the image sensor 120, the image sensor 120 may have the same axis as the optical axis and the lens assembly 101 may have the same axis as the optical axis after the first module I and the second module II are assembled.

As described above, in the camera apparatus and the electronic device including the same, according to various embodiments of the present disclosure, because the image sensor and the housing are mounted on a surface of the metal plate having a uniform flatness to make contact with the surface of the metal plate, tilting of the image sensor from an optical axis direction that may occur in an assembly process or tilting of the housing from the optical axis direction can be restrained. Furthermore, because the image sensor may be assembled in the assembly process to form the same axis as the optical axis direction and such that the image sensor and the lens assembly coincide with the optical axis direction and a camera apparatus that may have a stack state, in which the first module and the second module have substantially the same axis as the optical axis when the first module and the second module of the camera apparatus are assembled, the first module and the second module of the camera apparatus can be stacked such that the axes thereof coincide with the optical axis, from the assembly processes thereof.

In addition, because the IR filter is provided to cover the image sensor while being supported by the bracket, foreign substances can be restrained from being introduced into the image sensor while the second module is assembled after the first module is assembled.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
a first cover that defines one surface of the electronic device;
a second cover that defines an opposite surface of the electronic device; and
a camera assembly of which at least a portion is arranged in a space defined between the first cover and the second cover,
wherein the camera assembly comprises:
a metal plate that is arranged substantially parallel to the first cover,
a printed circuit board that is arranged between the first cover and the metal plate, and is attached to the metal plate, the printed circuit board having an opening arranged substantially at a center thereof, and a through-hole arranged outside the opening,
an image sensor that is arranged in the opening and is attached to the metal plate,
a lens assembly that is arranged adjacent to the image sensor, and
a side surface that surrounds at least a portion of the image sensor and the lens assembly, and
wherein at least a portion of the side surface passes through the through-hole to be connected to the metal plate.
2. The electronic device of claim 1, further comprising:
a coupling boss that passes through the through-hole, is seated on the metal plate, and protrudes from the side surface.
3. The electronic device of claim 2,
wherein an image introduced onto the image sensor substantially coincides with an optical axis direction of the image sensor if the image sensor is attached to the metal plate, and
wherein the lens assembly and the image sensor are arranged substantially parallel to each other such that the image introduced onto the camera assembly substantially coincides with the optical axis direction if the coupling boss passes through the through-hole and is fixed to the metal plate.
4. The electronic device of claim 2,
wherein the side surface comprises:
a first body on which the lens assembly is mounted, and
a second body that is located on an outer surface of the first body, and
wherein at least a portion of the coupling boss protrudes from:
an end of the first body,
an end of the second body, or
both of the ends of the first body and the second body.

5. The electronic device of claim 1, wherein at least a portion of the through-hole is offset between the opening and a periphery of the printed circuit board.

6. The electronic device of claim 1, wherein at least a portion of a periphery of the through-hole is offset along a periphery of the printed circuit board.

7. The electronic device of claim 1, further comprising:
an infrared (IR) filter mounted on an upper side of the printed circuit board; and
a bracket, which supports the IR filter such that the IR filter is substantially parallel to the image sensor, mounted between the printed circuit board and the IR filter along a periphery of the opening.

8. An electronic device comprising:
a first cover that defines one surface of the electronic device;
a second cover that defines an opposite surface of the electronic device; and
a camera assembly of which at least a portion is arranged in a space defined between the first cover and the second cover,
wherein the camera assembly comprises:
a metal plate that is arranged substantially parallel to the first cover, the metal plate having a protruding surface,
a printed circuit board that is attached to the metal plate,
an image sensor that is attached to the metal plate,
a lens assembly that is arranged adjacent to the image sensor and aligned to the metal plate, and
a side surface that surrounds at least a portion of the image sensor and the lens assembly, and
wherein at least a portion of the side surface has a depressed portion that is seated on the protruding surface and is connected to the metal plate while corresponding to the protruding surface.

9. The electronic device of claim 8,
wherein an image introduced onto the image sensor substantially coincides with an optical axis direction of the image sensor if the image sensor is attached to the metal plate, and
wherein the lens assembly and the image sensor are arranged substantially parallel to each other such that the image introduced onto the camera assembly substantially coincides with the optical axis direction if the side surface is engaged with the depressed portion and is fixed to the metal plate.

10. The electronic device of claim 8, further comprising:
an infrared (IR) filter is mounted on an upper side of the printed circuit board; and
a bracket, which supports the IR filter such that the IR filter is substantially parallel to the image sensor, mounted between the printed circuit board and the IR filter.

11. A camera apparatus comprising:
a board including:
a metal plate that is flat, and
a printed circuit board attached to the metal plate and having a first opening arranged substantially at a center thereof, and a second opening around the first opening;
an image sensor that is attached to the metal plate through an inner side of the first opening and is electrically connected to the printed circuit board;
a housing on which a lens assembly arranged adjacent to the image sensor is mounted, and which surrounds the image sensor; and
a coupling end that passes through the second opening and is seated on, and fixed to the metal plate that is provided at an end of the housing,
wherein the coupling end protrudes from at least a portion of the end of the housing.

12. The camera apparatus of claim 11, wherein the housing comprises:
a first body on which at least one lens module is mounted, and
a second body that is provided on an outer surface of the first body.

13. The camera apparatus of claim 12, wherein at least a portion of the second opening is offset between the first opening and a periphery of the printed circuit board, or is offset along the periphery of the printed circuit board.

14. The camera apparatus of claim 11, wherein the coupling end protrudes from at least a portion of the first body and the second body, the ends of which are engaged with each other.

15. The camera apparatus of claim 11, wherein the coupling end protrudes from at least a portion of an end of the second body.

16. The camera apparatus of claim 11, further comprising:
an infrared (IR) filter mounted on an upper side of the printed circuit board; and
a bracket, which supports the IR filter, mounted between the printed circuit board and the IR filter along a periphery of the first opening.

17. The camera apparatus of claim 11, wherein the image sensor and the housing are mounted on an upper side of the metal plate and are assembled to have the same axis as an optical axis of the image sensor.

18. A camera apparatus comprising:
a board that comprises:
a metal plate including an upper surface, a lower surface, and a side surface having a protruding surface, wherein the protruding surface is configured to protrude from at least one portion of the side surface; and
a printed circuit board attached to the lower surface of the metal plate;
an image sensor attached to the upper surface of the metal plate and electrically connected to the printed circuit board;
a lens assembly; and
a housing on which the lens assembly is arranged adjacent to the image sensor,
wherein the housing includes a depressed portion that receives the protruding surface of the metal plate,
wherein the housing surrounds the image sensor, and
wherein the lens assembly is aligned to the metal plate.

19. The camera apparatus of claim 18,
wherein, when the image sensor is attached to the metal plate, an image introduced onto the image sensor substantially coincides with an optical axis direction of the image sensor, and
wherein, when a side surface of the housing is engaged with the depressed portion and fixed to the metal plate, the lens assembly and the image sensor are arranged to be substantially parallel to each other such that the image introduced onto the image sensor substantially coincides with the optical axis direction.

20. The camera apparatus of claim 18, further comprising:
an infrared (IR) filter mounted on an upper side of image sensor; and
a bracket for supporting the IR filter such that the IR filter is substantially parallel to the image sensor, wherein the bracket is mounted between the printed circuit board and the IR filter.

* * * * *